United States Patent [19]

Takahashi et al.

[11] Patent Number: 4,836,245
[45] Date of Patent: Jun. 6, 1989

[54] CONTROL VALVE

[75] Inventors: Yoneaki Takahashi; Keiji Sekikawa, both of Saitama, Japan

[73] Assignee: Kayaba Industry Co., Ltd., Japan

[21] Appl. No.: 256,647

[22] Filed: Oct. 12, 1988

[30] Foreign Application Priority Data

Oct. 14, 1987 [JP] Japan ................... 62-157278

[51] Int. Cl.$^4$ ........................... F15B 13/042
[52] U.S. Cl. ................. 137/599; 137/614.17; 137/614.2; 251/33
[58] Field of Search .............. 137/599, 614.17, 614.2; 251/33

[56] References Cited

U.S. PATENT DOCUMENTS 2,532,568  12/1950  Myers .......................... 251/33 X
2,752,946   7/1956  Towler et al. ............ 137/614.17 X Primary Examiner—John Rivell
Attorney, Agent, or Firm—Steinberg & Raskin

[57] ABSTRACT

A control valve including a change-over poppet formed into a substantially cylindrical shape, a guide pipe inserted into the change-over poppet, and a load check poppet slidably fitted on the guide pipe. The change-over poppet is formed with a communication hole. A parallel passage is provided so as to communicate through the communication hole and guide pipe with an on-off valve, and between the parallel passage and the on-off valve is arranged an orifice. Opening of the on-off valve causes fluid to flow through the orifice and pressure loss to occur across the orifice to increase a pressure on an upstream side of the orifice, which acts to open the change-over poppet.

1 Claim, 1 Drawing Sheet

CONTROL VALVE

BACKGROUND OF THE INVENTION

This invention relates to a control valve, and more particularly to a control valve suitable for a construction equipment.

A conventional control valve of such type is generally constructed as shown in FIG. 1. More particularly, the control valve includes a valve body a formed therein with a neutral passage 1 and a first load check poppet 2 provided on a downstream side of the neutral passage 1. The first load check poppet 2 is adapted to permit fluid to be flowed only in a direction from the neutral passage 1 to a supply passage 3 communicating with an actuator (not shown).

The valve body a is also formed therein with a parallel passage 4 communicating with the supply passage 3 and provided therein with a change-over poppet 5 and a second load check poppet 6 between the parallel passage 4 and the supply passage 3.

The change-over poppet 5 is so arranged that its one end or distal end faces a pilot chamber 7, which is formed so as to communicate through a communication hole 8 and an annular groove 9 with the parallel passage 4. The other end of the change-over poppet 5 faces a spring chamber 11 having a spring 10 arranged therein. The spring chamber 11 is formed so as to communicate through an orifice 12 with the annular groove 9 and is connected through an on-off valve 13 to a tank 14.

In the conventional control valve constructed as described above, when pressure fluid is supplied through the neutral passage 1 to the valve body a, it opens the first load check poppet 2. This causes the fluid to be supplied to the feed passage 3 and then to the actuator (not shown).

When the on-off valve 13 is changed over from its closed position to its open position, fluid in the parallel passage 4 flows through the annular groove 9, orifice 12, spring chamber 11 and on-off valve 13 to the tank 14, so that pressure loss of fluid passed through the orifice 12 may occur across the orifice to generate on an upstream side of the orifice 12. The so-generated pressure is applied through the communication hole 8 to the pilot chamber 7, resulting in the change-over poppet 5 being moved against the spring 10 due to the pressure applied to the pilot chamber 7.

Such movement of the change-over poppet 5 causes the parallel passage 15 to communicate through the annular groove 9 with the communication passage 15. Therefore, pressure fluid flowing from the parallel passage 4 to the communication passage 15 opens the second load check poppet 6, resulting in being supplied to the supply passage 3.

Thus, the conventional control valve requires to provide the change-over poppet 5 and second load check poppet 6 separately. This leads to large-sizing of the control valve and complication of its structure.

SUMMARY OF THE INVENTION

The present invention has been made in view of the foregoing disadvantage of the prior art.

Accordingly, it is an object of the present invention to provide a control valve which is capable of being significantly small-sized.

It is another object of the present invention to provide a control valve which is capable of being simplified in structure.

It is a further object of the present invention to provide a control valve which is capable of being readily manufactured.

It is still another object of the present invention to provide a control valve which is capable of accomplished the above-described objects by arranging a check poppet in a change-over poppet.

In accordance with the present invention, a control valve is provided. The control valve includes a valve body formed therein with a parallel passage and a tandem passage, a change-over poppet arranged in the valve body so as to operate the tandem passage and formed with a communication hole, and a load check poppet provided on a downstream side of the change-over poppet.

The change-over poppet is formed into a substantially cylindrical shape. The control valve also includes a guide pipe inserted into said change-over poppet, on which the load check poppet is slidably fitted. The valve body is formed therein with a flow path extending from the parallel passage through the communication hole and guide pipe to an on-off valve, and the flow path is provided with an orifice adapted to cause pressure loss of fluid passed through the orifice to occur across the orifice to generate a pressure which acts on the change-over poppet to open it to communicate the parallel passage with an actuator.

In the control valve of the present invention constructed as described above, when fluid in a spring chamber is supplied to a tank while the on-off valve is kept at its open position, it also flows through the orifice, so that pressure loss of the fluid occurs across the orifice to produce a pressure. The pressure acts on the change-over poppet to move it, to thereby communicate the parallel passage with an actuator.

As described above, in the present invention, the load check poppet is arranged in the change-over poppet of a cylindrical shape, so that the control valve may be small-sized and simplified in structure, resulting in being simply manufactured.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, a control valve according to the present invention will be described hereinafter with reference to the drawings.

Figure 1:
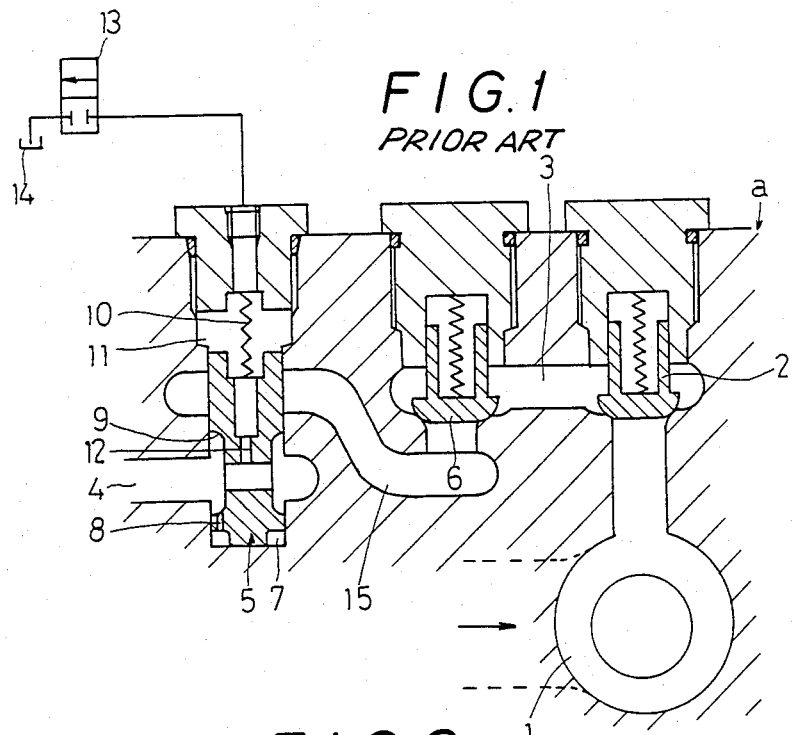
FIG. 1 is a fragmentary sectional view showing an essential part of a conventional control valve.
Figure 2:
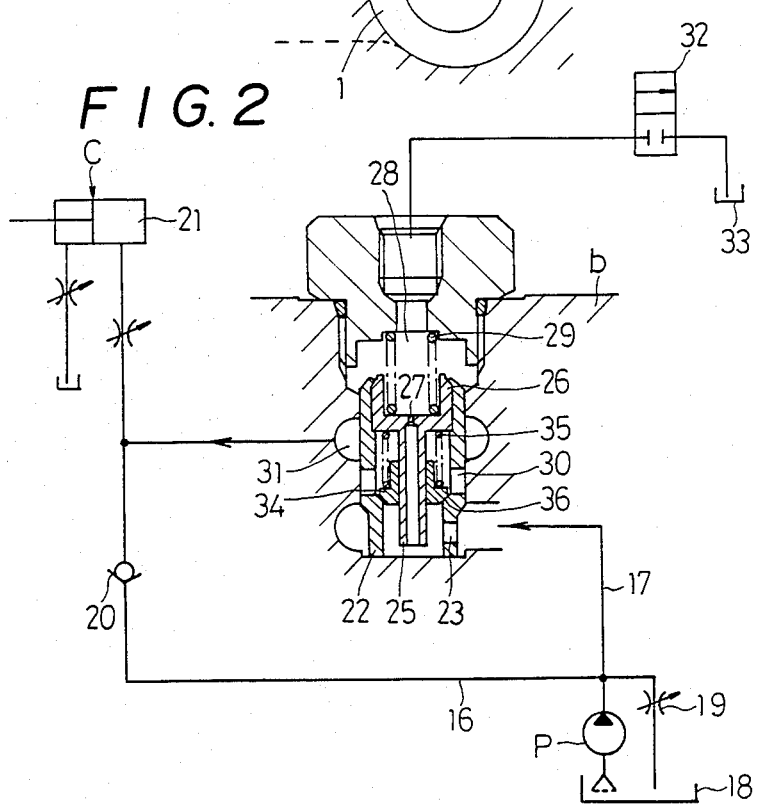
FIG. 2 is a circuit diagram showing an essential part of an embodiment of a control valve according to the present invention.

FIG. 2 shows an embodiment of a control valve according to the present invention. A control valve of the illustrated embodiment includes a valve body b which is connected to a pump P and formed therein with a tandem passage 16 and a parallel passage 17. The valve body b is connected on an upstream side thereof to a flow control valve 19 communicating with a tank 18. The tandem passage 16 is arranged in a manner to communicate through a first load check poppet 20 with a bottom side chamber 21 of a cylinder C, whereas the parallel passage 17 communicates with a communication hole 23 of a change-over poppet 22 formed into a cylindrical shape.

The change-over poppet 22 is formed therein with a guide pipe 25, which has a spring bearing 26 integrally formed at an upper end thereof and fitted on an inner periphery of the change-over poppet 22. The spring bearing 26 is formed at a bottom thereof with an orifice 27 communicating with the guide pipe 25.

Above the spring bearing 26 is arranged a spring chamber 28 in which a spring 29 is received. The spring 29 acts to keep the change-over poppet 22 at a normal position shown in FIG. 2.

The change-over poppet 22 is also formed with a switching hole 30. When the change-over poppet 22 is at the normal position, the switching hole 30 is closed; whereas when the change-over poppet 22 is upwardly moved against the spring 29, the switching hole 30 communicates with a supply passage 31. The spring chamber 28 is connected to an on-off valve 32 to a tank 33.

The control valve also includes a second load check poppet 34 slidably fitted on an outer periphery of the guide pope 25. Between the second load check poppet 34 and the spring bearing 26 is interposedly arranged a spring 35, so that the second load check poppet 34 is normally abutted against a seat 36 formed on an inner periphery of the change-over poppet 22 due to elastic force of the spring 35.

When the on-off valve 32 is kept at its closed position shown in FIG. 2, fluid is prevented from flowing through the orifice 27. Accordingly, the change-over poppet 22 is held at the normal position shown in FIG. 2 to keep the switching hole 30 closed.

Thus, fluid discharged from the pump P is supplied through the tandem passage 16 and first load check poppet 20 to the bottom side chamber 21 of the cylinder C.

Then, when the on-off valve 32 is changed over to its open position, pressure fluid in the parallel passage 17 is supplied through the communication hole 23, guide pipe 25, orifice 27, spring chamber 28 and on-off valve 32 to the tank 33. This causes pressure loss of fluid passed through the orifice 27 to occur across the orifice 27 to generate pressure which acts to move the change-over poppet 22 in an upward direction. This results in the change-over poppet 22 being moved against the spring 29, to thereby communicate the switching hole 30 with the supply passage 31.

Such communication between the switching hole 30 and the supply passage 31 causes pressure fluid in the parallel passage 17 to be supplied through the communication hole 23, second load check poppet 34, switching hole 30 and supply passage 31 to the bottom side chamber 21 of the cylinder C.

As can be seen from the foregoing, in the control valve of the illustrated embodiment, the second load check poppet 34 is arranged in the change-over poppet 22. Thus, the control valve can be small-sized and simplified in structure.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A control valve comprising:
a valve body provided with a parallel passage and a tandem passage;
a change-over poppet arranged in said valve body so as to operate said tandem passage and formed with a communication hole;
a load check poppet provided on a downstream side of said change-over poppet;
said change-over poppet being formed into a substantially cylindrical shape;
a guide pipe inserted into said change-over poppet;
said load check poppet being slidably fitted on said guide pipe;
a flow path provided on said valve body in a manner to extend from said parallel passage through said communication hole and guide pipe to an on-off valve; and
an orifice arranged in said flow path to generate a pressure difference which acts on said change-over poppet to open said change-over poppet to communicate said parallel passage with an actuator.

* * * * *